(12) United States Patent
Bass

(10) Patent No.: US 6,509,557 B1
(45) Date of Patent: Jan. 21, 2003

(54) APPARATUS AND METHOD FOR HEATING SINGLE INSULATED FLOWLINES

(75) Inventor: Ronald M. Bass, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/629,963

(22) Filed: Aug. 1, 2000

Related U.S. Application Data
(60) Provisional application No. 60/147,018, filed on Aug. 3, 1999.

(51) Int. Cl.⁷ .................................. H05B 6/60
(52) U.S. Cl. ................. 219/772; 219/778; 392/318; 392/480; 166/248; 166/60; 405/131
(58) Field of Search ............... 219/772, 770, 219/778, 780, 774; 392/314, 315, 318, 480, 481, 478, 479; 166/248, 60; 405/131

(56) References Cited

U.S. PATENT DOCUMENTS

| | | | |
|---|---|---|---|
| 2,224,403 A | 12/1940 | Lines | 219/39 |
| 2,306,831 A | 12/1942 | Proctor | 219/39 |
| 2,806,931 A | 9/1957 | Akerlof | 219/19 |
| 2,851,197 A | 9/1958 | Colton | 222/146 |
| 3,327,086 A * | 6/1967 | Cable | 219/780 |
| 3,483,374 A | 12/1969 | Erben | 250/49.5 |
| 3,515,837 A | 6/1970 | Ando | 219/10.49 |
| 3,549,943 A | 12/1970 | Church | 315/111 |
| 3,604,893 A | 9/1971 | Horton | 219/300 |
| 3,891,828 A | 6/1975 | De Corso | 219/383 |
| 3,975,617 A | 8/1976 | Othmer | 219/300 |
| 4,545,435 A * | 10/1985 | Bridges et al. | 166/248 |
| 4,645,906 A | 2/1987 | Yagnik et al. | 219/301 |
| 4,716,960 A | 1/1988 | Eastlund et al. | 166/60 |
| 4,808,795 A | 2/1989 | Thörnblom | 219/383 |
| 5,100,259 A * | 3/1992 | Buelt et al. | 219/778 |
| 5,142,115 A | 8/1992 | Weidman et al. | 219/10.491 |
| 5,241,147 A | 8/1993 | Ahlen | 219/10.51 |
| 5,256,844 A | 10/1993 | Grosvik et al. | 219/10.51 |
| 5,289,561 A | 2/1994 | Filho | 392/478 |
| 5,834,746 A * | 11/1998 | Pedersen et al. | 219/771 |
| 5,960,644 A | 10/1999 | Nagelvoort et al. | 62/622 |

FOREIGN PATENT DOCUMENTS

| | | | |
|---|---|---|---|
| GB | 1 248 572 | 10/1971 | 213/210 |
| JP | 0105343 | 8/1979 | H05B/7/06 |
| JP | 0092000 | 6/1983 | 392/478 |
| SU | 0932084 | 5/1982 | 392/478 |

OTHER PUBLICATIONS

Brochure—*Introduction to Direct Heating of Subsea Pipelines*, Statoil, Saga Petroleum, Feb. 1998.

* cited by examiner

*Primary Examiner*—Philip H. Leung

(57) ABSTRACT

Apparatus and method are provided for electrically heating subsea pipelines. An electrically insulating layer is placed over the pipe in the segment of the pipeline to be heated and electrical current is caused to flow axially through the steel wall of the pipe. In one embodiment (end fed), an insulating joint at the host end of the pipeline is used to apply voltage to the end of the segment. At the remote end an electrical connector is used to conduct the electrical current to a return cable or to a seawater electrode. A buffer zone of the pipeline beyond the remote end is provided. Separate electrical heating may also be applied in the buffer zone. Electrical chokes may be used in different arrangements to decrease leakage current in the pipeline outside the heated segment. In another embodiment (center fed), voltage is applied at or near the midpoint of the segment to be heated through an electrical connector and no insulating joint is used. Buffer zones, heating of buffer zones and electrical chokes may also be employed in this embodiment.

17 Claims, 35 Drawing Sheets

APPARATUS AND METHOD FOR HEATING SINGLE INSULATED FLOWLINES

This application claims the benefit of U.S. provisional application No. 60/147,018, filed Aug. 3, 1999.

BACKGROUND OF THE INVENTION

1. Field of the Invention

The present invention relates to heating of subsea pipelines. More particularly, the invention relates to electrically heating a pipeline that is electrically insulated from seawater.

2. Description of Related Art

Offshore hydrocarbon recovery operations are increasingly moving into deeper water and more remote locations. Often satellite wells are completed at the sea floor and are tied to remote platforms or other facilities through extended subsea pipelines. Some of these pipelines extend through water that is thousands of feet deep and where temperatures of the water near the sea floor are in the range of 40° F. The hydrocarbon fluids, usually produced along with some water, reach the sea floor at much higher temperatures, characteristic of depths thousands of feet below the sea floor. When the hydrocarbon fluids and any water present begin to cool, phenomena occur that may significantly affect flow of the fluids through the pipelines. Some crude oils become very viscous or deposit paraffin when the temperature of the oil drops, making the oil practically not flowable. Hydrocarbon gas under pressure combines with water at reduced temperatures to form a solid material, called a "hydrate." Hydrates can plug pipelines and the plugs are very difficult to remove. In deep water, conventional methods of depressuring the flow line to remove a hydrate plug may not be effective. Higher pressures in the line and uneven sea floor topography require excessive time and may create more operational problems and be costly in terms of lost production.

The problem of lower temperatures in subsea pipelines has been addressed by placing thermal insulation on the lines, but the length of some pipelines makes thermal insulation alone ineffective. Increased flow rate through the lines also helps to minimize temperature loss of the fluids, but flow rate varies and is determined by other factors. Problems of heat loss from a pipeline increase late in the life of a hydrocarbon reservoir because production rates often decline at that time. Problems become particularly acute when a pipeline must be shut-in for an extended period of time. This may occur, for example, because of work on the wells or on facilities receiving fluids from the pipeline. The cost of thermal insulation alone to prevent excessive cooling of the lines becomes prohibitive under these conditions.

Heating of pipelines by bundling the lines with a separate pipeline that can be heated by circulation of hot fluids has been long practiced in the industry. Also, heating by a variety of electrical methods has been known. Most of the proposals for electrical heating of pipelines have related to pipelines on land, but in recent years industry has investigated a variety of methods for electrical heating of subsea pipelines. ("Direct Impedance Heating of Deepwater Flowlines," OTC 11037, May, 1999)

Two configurations for electrical heating have been considered. In one method of electrical heating, a pipe-in-pipe subsea pipeline is provided by which a flow line for transporting well fluids is the inner pipe and it is surrounded concentrically by and electrically insulated from an electrically conductive outer pipe until the two pipes are electrically connected at one end. Voltage is applied at the opposite end and electrical current flows along the exterior surface of the inner pipe and along the interior surface of the outer pipe. This pipe-in-pipe method of heating is disclosed, for example, in commonly assigned application Ser. No. 08/625,428, filed Mar. 26, 1996, now U.S. Pat. No. 6,624,428 issued Jul. 24, 2001.

In a second configuration, a single flowline is electrically insulated and current flows along the flowline. This is called the "SHIP" system (Single Heated Insulated Pipe). Two SHIP systems have been considered: the fully insulated system, requiring complete electrical insulation of the flowline from the seawater, and the earthed-current system, requiring electrical connection with the seawater through anodes or other means. For both systems, current is passed through the flowline pipe.

An earthed-current system developed in Norway does not require the use of insulating joints or defect-free insulation, and hence avoids the problem of shorting by water and the effects of coating defects. ("Introduction to Direct Heating of Subsea Pipelines," overview by Statoil, Saga et al, February 1998). In that system, power is connected directly to the pipe at each end of a heated section and electrodes connected to the pipe along the pipeline are exposed to seawater. This configuration allows current to flow in both the pipe and the seawater, therefore eliminating potential drop across the insulation on the pipe, so that a defect in the pipe insulation does not result in electrical failure. Since the heated section is not electrically isolated from the rest of the pipeline by insulation joints, some means must be provided to prevent current from flowing along the pipeline to areas where it may cause corrosion damage or interfere with control systems. This is accomplished by means of a buffer zone, which is a length of pipe approximately 50 meters in length between the power connection where current enters or leaves the pipeline and adjacent structures. In that design, the buffer zone may incorporate a series choke to further impede leakage currents. This method requires that the return cable be as close to the pipe as possible, or electrical efficiency will be impractically low. This configuration is not practical for some deepwater applications and the system is considerably less energy-efficient than a fully insulated system.

A fully insulated method of electrically heating a pipeline is disclosed in U.S. Pat. No. 6,049,657. In this method, an electrically insulated coating covers a single pipeline carrying fluids from a well. An alternating current is fed to one end of the pipeline through a first insulating joint near the source of electrical current and the current is grounded to seawater at the opposite end of the pipe to be heated through a second insulating joint. The single heated insulated pipe method of electrical heating of pipelines offers many advantages, but it has been found that the method utilizing the second insulating joint has a limitation. When water is present in the pipeline, the water will settle-out when the line is shut-in and can cause the second insulating joint to become electrically shorted. Hence, there is a need for apparatus and method that do not require the second insulating joint. After the second insulating joint at the remote end of the pipeline is eliminated, special configurations for minimizing leakage of electrical current beyond the section of the pipeline to be heated are needed. A configuration for minimizing voltage required for heating is also needed, since there is a voltage limit for the electrical insulation placed on a pipeline and this limit may determine the maximum length of heated pipeline. Thus, there remains a clear need for economical apparatus and method for electrical heating of a single insulated subsea pipeline without an insulating joint on or near the seafloor.

SUMMARY OF THE INVENTION

Toward providing these and other advantages, apparatus and method are provided for enhancing the flow of fluids by heating a subsea pipeline that is electrically insulated from seawater over the segment of line that is to be heated.

In one embodiment, apparatus and method are provided for heating a segment of a subsea pipeline by applying electrical voltage through an insulating joint at the host end of the segment, where a power supply is normally located, and that is elevated so that water cannot collect in the insulating joint. The power supply may be a conventional electrical generator supplying alternating current. The electrical current flows axially along the metal walls of the pipeline to an electrical connector at the remote end of the segment. Current is then directed to a seawater electrode and returns to another seawater electrode connected to the power supply. A buffer zone, that may be electrically or thermally insulated over at least a portion of its surface, is provided in the pipeline beyond the electrical connector. The buffer zone decreases the effects of current flow outside the segment between the insulating joint and the electrical connector. This current flow can affect an adjoining structure or equipment. The buffer zone may be heated by a heater powered with the current flowing through the pipeline. Electrical chokes may be used to increase impedance to current flow along the pipeline in the buffer zone. The chokes may enclose the pipeline only, the pipeline and cable or may be made with concentric conductors to provide a more uniform magnetic field.

In another embodiment, current flow outside the heated segment to complete an electrical circuit back to the power supply is provided by electrical cables. In this embodiment, seawater electrodes are not used for the heating current along the pipeline, and may or may not be used for safe discharge of the leakage current into the seawater. Heating of the buffer zone and use of electrical chokes are also provided in this embodiment.

In yet another embodiment, no insulating joint is utilized and electrical voltage is applied to electrical connectors at the midpoint of the electrically insulated segment that is to be heated and electrical connectors are placed at each end of the segment. Return current to the power supply may flow through seawater, via seawater electrodes, or by cables. Buffer zones outside the heated segment minimize the effects of current flow to adjacent structures or equipment. Current flow in the buffer zones may be decreased by use of electrical chokes and seawater electrodes. Buffer zones may be heated by external heaters in series with current flow through the electrically insulated segment of the pipeline between the electrical connectors.

DESCRIPTION OF THE DRAWINGS

For a more complete understanding of the invention and the advantages thereof, reference is now made to the following description taken in conjunction with the following drawings in which like reference numbers indicate like features and wherein.

DETAILED DESCRIPTION

Figure 1:
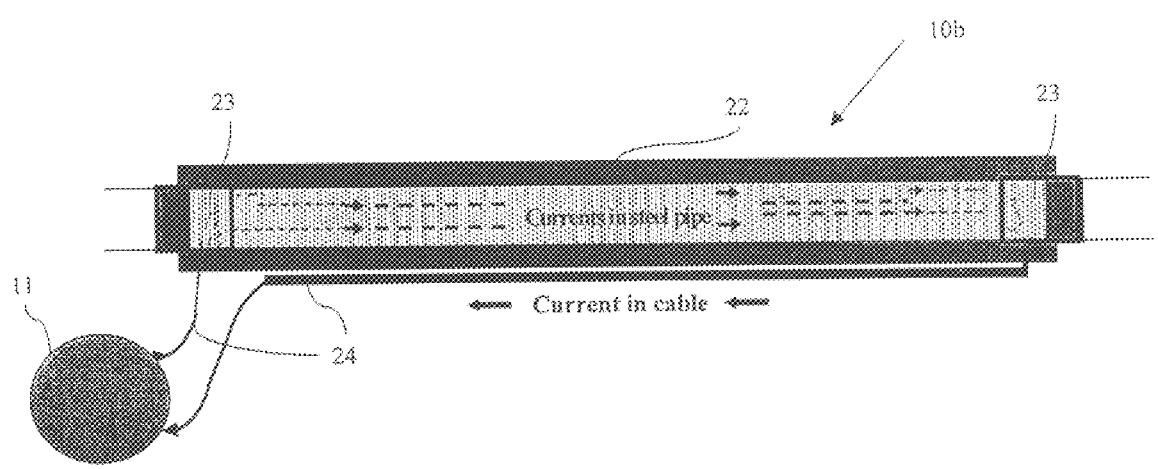
FIG. 1 illustrates a prior art direct electrical heating of a single heated insulated pipe having two flow line insulating joints with cable return of electrical current.

Referring to FIG. 1, the concept of a single heated insulated pipe (SHIP) is illustrated. Alternating current (AC) power supply 11, commonly supplying 50–60 Hz electrical power, may be used to supply the electrical power. Pipe electrical insulation 22 prevents current flow between the steel walls of a heated segment of a subsea pipeline, indicated generally at 10b, and surrounding seawater. Insulating joints 23 connect to the ends of segment 10b that is to be heated and serve to electrically insulate segment 10b from the adjoining segments (not shown) of the pipeline. Electrical current flows from a first insulating joint through the steel wall of segment 10b to a second insulating joint and is then returned through cable 24 to power supply 11, thus completing the electrical circuit. The end of the heated segment of the pipeline where the second insulating joint is shown will be referred to herein as the "remote end" of the heated segment. The remote end will normally be on or near the seafloor. The limitation of flowline insulating joints 23 in long subsea pipelines is that water in the fluids passing through the pipeline may settle to the bottom of a pipeline or to low intervals along the length of the line, particularly when flow through the line is interrupted. The water can then cause an electrical short across the insulation joint, allowing the electrical power supplied for heating segment 10b to be lost by flow through other sections of the line and surrounding seawater.

Figure 2:
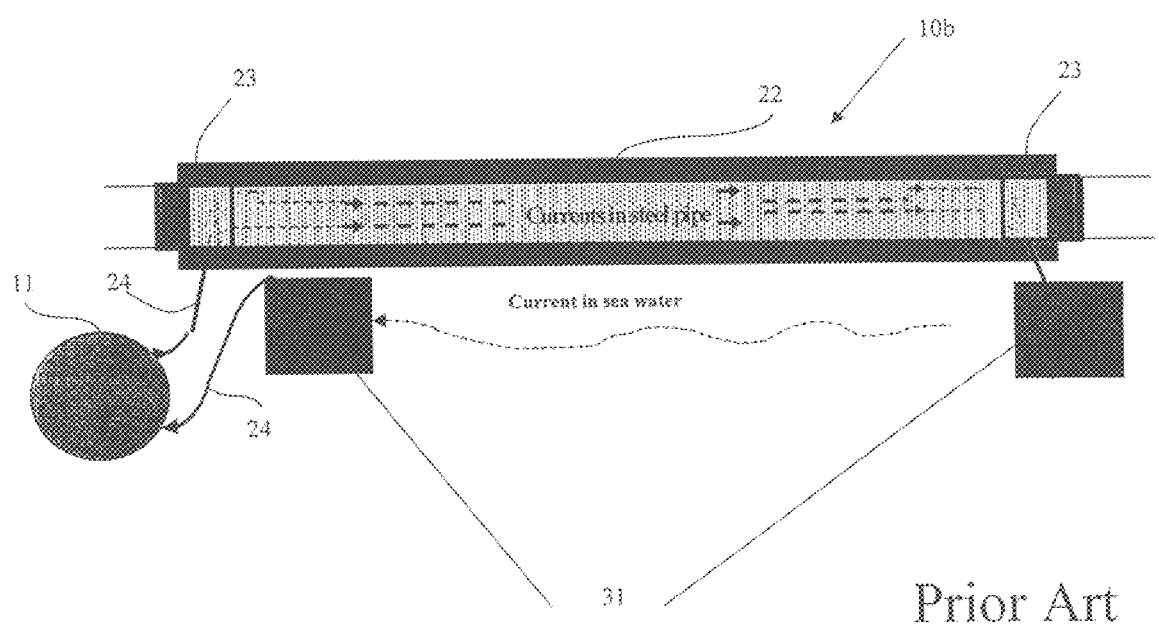
FIG. 2 illustrates a prior art direct electrical heating of a single heated insulated pipe having two flow line insulating joints with seawater return of electrical current.

FIG. 2 illustrates a similar configuration to that shown in FIG. 1, also prior art, except the return current between insulating joints 23 is now through seawater. Seawater electrodes 31 allow current to flow between insulating joints and seawater. Cables 24 connect the AC power supply to a first insulating joint 23 and to a seawater electrode. Seawater electrodes and insulating joints are known in the subsea pipeline industry. Flowline insulating joints such as joints 23 have been used in offshore corrosion protection systems, but normally with low voltage and current ratings and without an external electrical connection introducing electrical current at the insulation joint. The phenomena of water settling and causing an electrical short circuit across insulating joints has been observed in offshore operations. Consequently, for many applications it is desirable to use a heating method for single heated insulated pipe that does not require the use of a flowline insulating joint at the remote (low voltage) end of the segment of pipeline to be heated.

Figure 3:
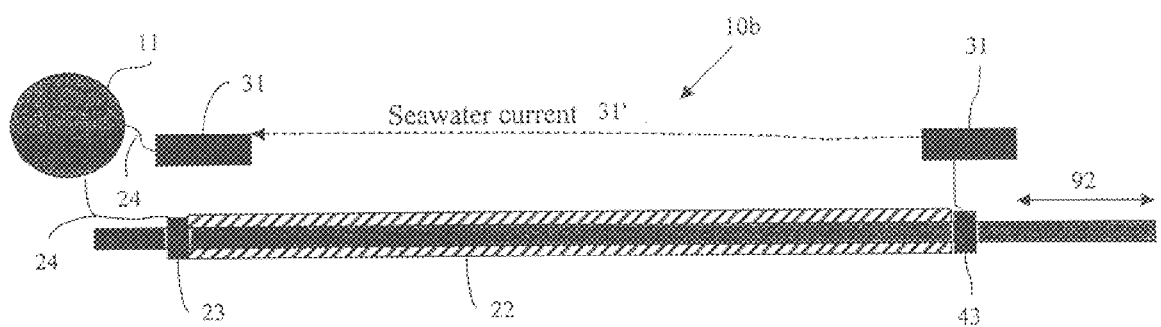
FIG. 3 illustrates a single insulated pipe, end-fed, with an insulating joint at the host end, with seawater return and a buffer zone along the pipeline between the remote end connector and nearby or attached structures.

FIG. 3 illustrates a fully insulated single heated pipe wherein the total voltage drop along the pipeline is present at insulating joint 23. Insulating layer 22 covers segment 10b of an insulated flowline. Methods for placing insulation layer 22, normally a thermoplastic layer, on pipelines is disclosed in commonly assigned patent application titled "Fabrication and Repair of Electrically Insulated Flowlines by Induction Heating," filed concurrently herewith as Ser. No. 09/629,378, now U.S. Pat. No. 6,278,096 issued Aug. 21, 2001, and hereby incorporated by reference herein. Electrical power from power supply 11 is brought to insulating joint 23 by cable 24. Methods for attaching cables for power and other uses to subsea pipelines are more fully disclosed in commonly assigned patent application titled "Apparatus and Method for Connecting Cables to Subsea Flowlines," filed concurrently herewith as Ser. No. 09/629,377, now abandoned, and hereby incorporated by reference herein. Insulating joint 23 is located at a "host" location, which is the location where AC power supply 11 is connected to the pipeline. This may be on or near an offshore platform or on or near a floating vessel used for offshore pipeline operations. Insulated flowline 10b, which is a segment of a subsea pipeline, is to be heated. Seawater electrodes 31 are located at the host location and at the "remote end" of the pipeline, which will normally be on the seafloor. Instead of an insulating joint such as 23 at the deep water end, electrical connector 43 is made to seawater electrode 31. The electrical connector serves to bring current to a location on the pipeline but does not electrically insulate the segment of the pipeline on each side of the location. Then buffer zone 92 is provided between electrical connector 43 and any structure or equipment that may be adversely affected by stray electrical currents. Seawater current 31' passes between electrodes 31 and returns to power supply 11. If not properly managed, the flow of current 31' in the seawater or farther down the pipeline beyond segment 10b and connector 43 may cause AC corrosion of nearby or attached structures, or interfere with operation of control systems or equipment. For these reasons, it is desirable to minimize the amount of current that may flow down the pipe from connector 43 to adjacent structures. Buffer zone 92 is provided to minimize such current flow effects outside heated segment 10b. The length of buffer zone 92 may be selected to reduce current flow effects outside the heated segment to an acceptable level, as determined by measurements on adjacent structures or equipment. The length of buffer zone 92 may be about 50 meters, for example. This configuration does not require an insulating joint on the subsea or remote portion of a pipeline.

Figure 4:
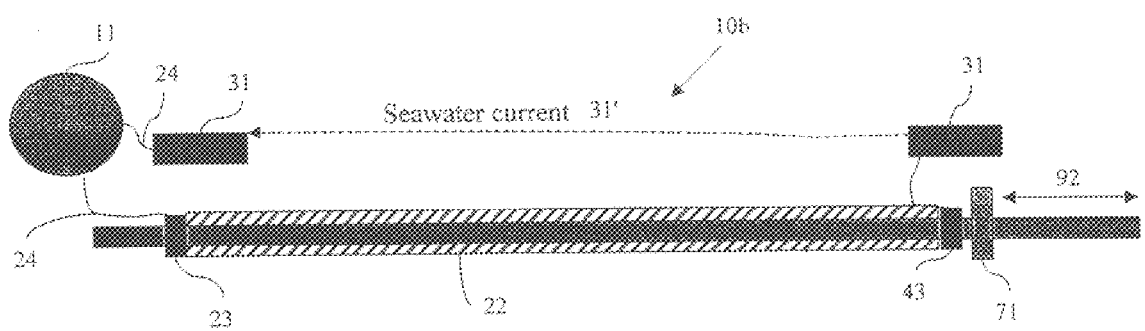
FIG. 4 illustrates a single insulated pipe, end-fed, with seawater return and a buffer zone and with an electrical choke around the pipeline in the buffer zone.

FIG. 4 illustrates apparatus and method that can be used to impede current flow in the pipe beyond end connector 43. Electrical choke 71 is placed around the pipeline. Choke 71 may be a ferromagnetic toroid and may be of a material and construction similar to the core of an electrical transformer. Alternatively, choke 71 may be constructed to use a powdered ferrite material.

Figure 5:
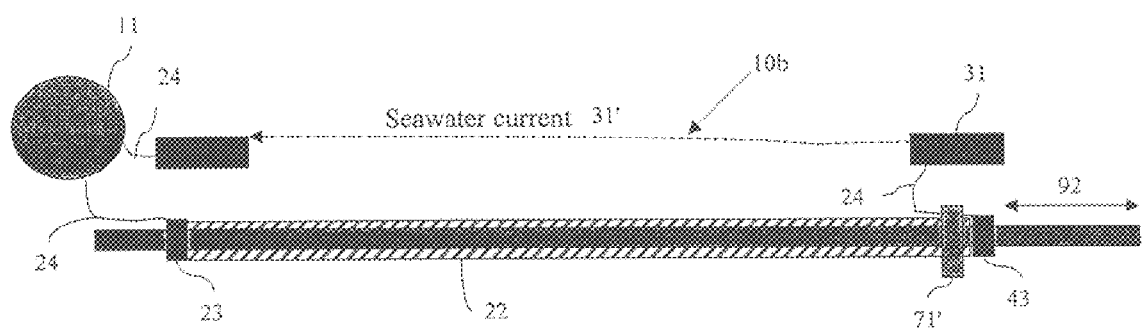
FIG. 5 illustrates a single insulated pipe, end-fed, with seawater return and a buffer zone and with a current balancing choke around the heated pipeline and the cable to a sea water electrode, so as to cause the electrical current in the pipeline and the sea water electrode to be nearly equal.

In another embodiment, shown in FIG. 5, a current-balancing choke configuration is shown. Choke 71' encloses both pipeline segment 10b and cable 24 between connection 43 and seawater electrode 31. Choke 71' forces the net current flowing through it to be nearly zero, so that the currents in segment 10b and seawater electrode 31 are nearly equal. Therefore, seawater current 31' is nearly equal to the current in segment 10b and little current can flow farther down the pipeline toward a wellhead or other structures.

Figure 6:
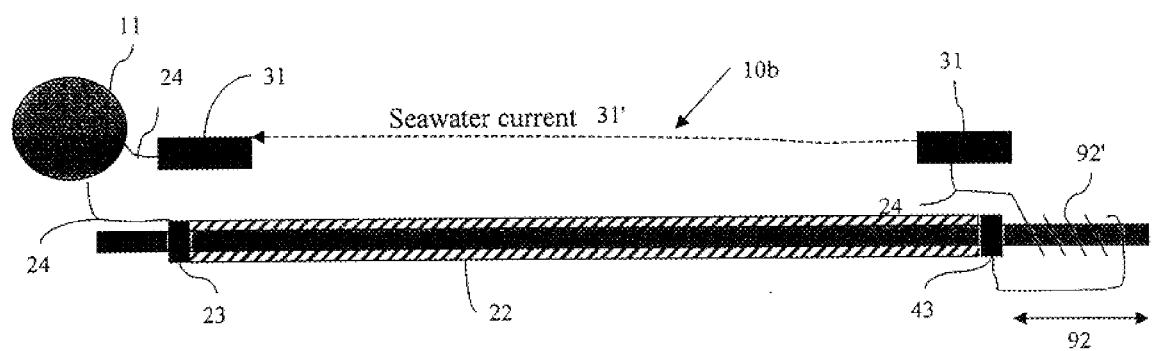
FIG. 6 illustrates a single insulated pipe, end fed, with seawater return and a buffer zone and with electrical heating of the buffer zone.

FIG. 6 illustrates a method for heating buffer zone 92 with the same current that is used to heat segment 10b of the pipeline. Of course, buffer zone 92 may be susceptible to the same problems from lowering of temperature as heated segment 10b. Heating element 92' for heating buffer zone 92 is connected in series with the pipeline current. Heating element 92' can be a heat tracing element of the type that is known commercially, or inductive heating (also known commercially), which can be achieved by wrapping cable 24 around the pipe in buffer zone 92 with an appropriate number of turns, as subsequently described. Alternatively, a separate cable may also be used to provide current for induction heating or heat tracing if, for example, the seawater return method of FIG. 3 is used and there is no return cable, since this method also requires a buffer zone. Other possible heating configurations for the buffer zone include, but are not limited to, use of a transformer with its primary winding in series with the heating current and the secondary winding sized to match the voltage and current requirements of the heat tracing or inductive heating circuit.

Figure 7:
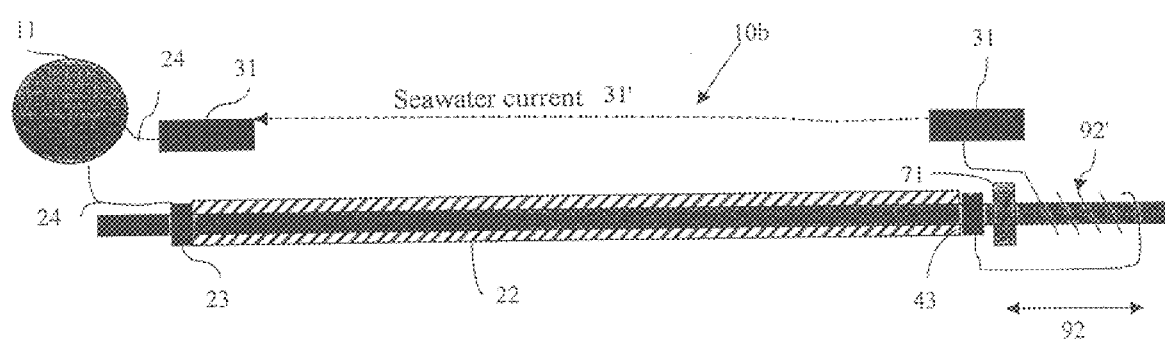
FIG. 7 illustrates a single insulated pipe, end fed, with seawater return and a buffer zone with electric heating of the buffer zone and a series choke.
Figure 8:
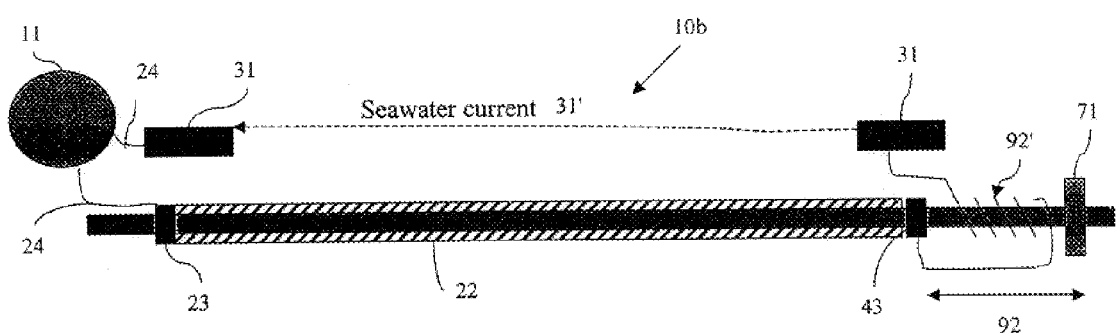
FIG. 8 illustrates a single insulated pipe, end fed, with seawater return and a buffer zone and a series choke in the buffer zone outside separate electrical heating of the buffer zone.
Figure 9:
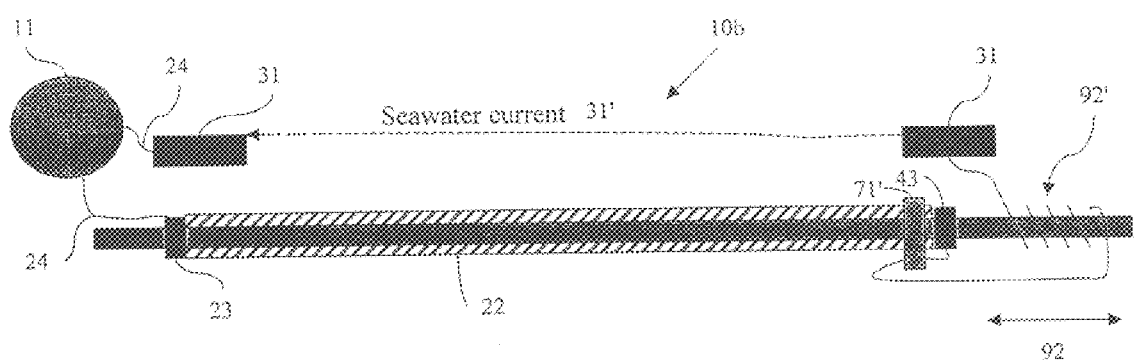
FIG. 9 illustrates a single insulated pipe, end fed, with sea water return and a buffer zone and a current-balancing choke on the heating current and cable for separate electrical heating of the buffer zone.
Figure 10:
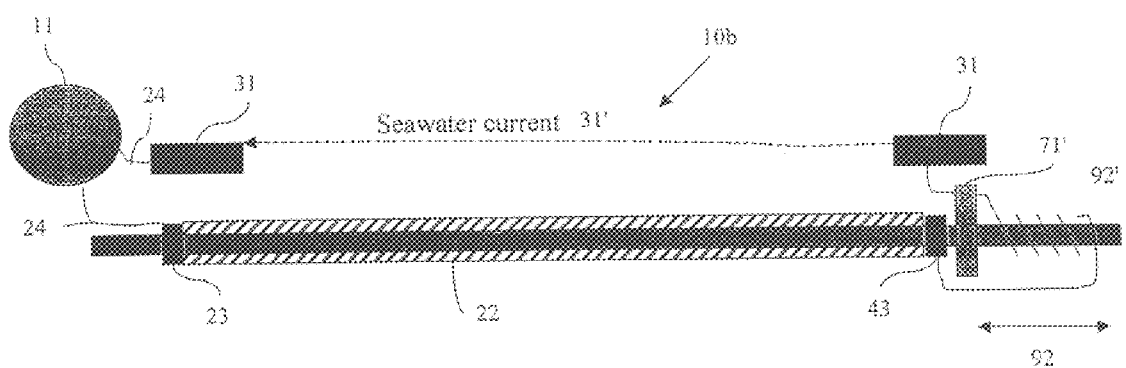
FIG. 10 illustrates a single insulated pipe, end fed, with seawater return having a buffer zone having an electrical heater in the buffer zone and a choke in the buffer zone around current from the electrical heater.

FIGS. 7 through 10 show various combinations of buffer zone heating and chokes. In FIG. 7 the choke is placed between connector 43 and heater 92'. In FIG. 8, the choke is placed past heater 92', also on leakage current. In FIG. 9 the choke is placed within segment 10b and the cable carrying the current passing through heater 92' is also passed through the choke. In FIG. 10 the choke is placed between connector 43 and heater 92' and current passing through the heater is also passed through the choke.

A seawater return is the least expensive way to build a heating system. However, seawater currents can cause damage through AC corrosion or interference with control systems, if not carefully managed. For this reason, it may be desirable to minimize seawater currents 31'. Current in the seawater may be minimized by returning the current by means of a cable.

Figure 11:
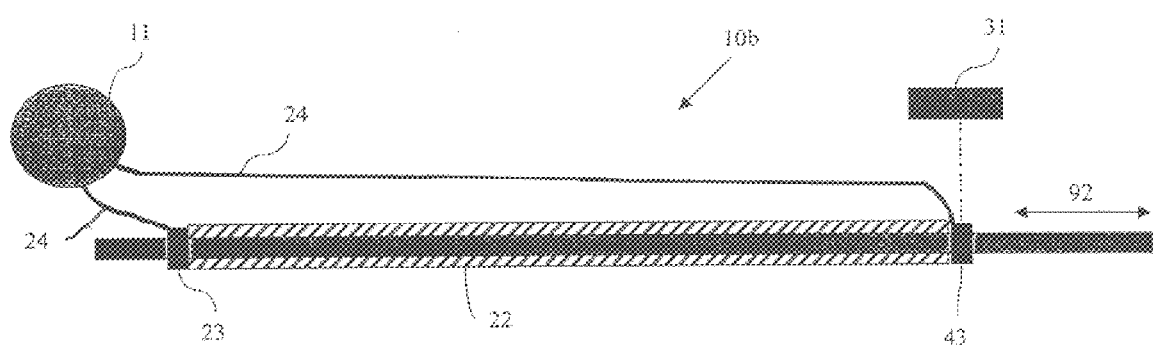
FIG. 11 illustrates a single insulated pipe, end fed, with cable return with a buffer zone and with optional seawater return of leakage current.
Figure 12:
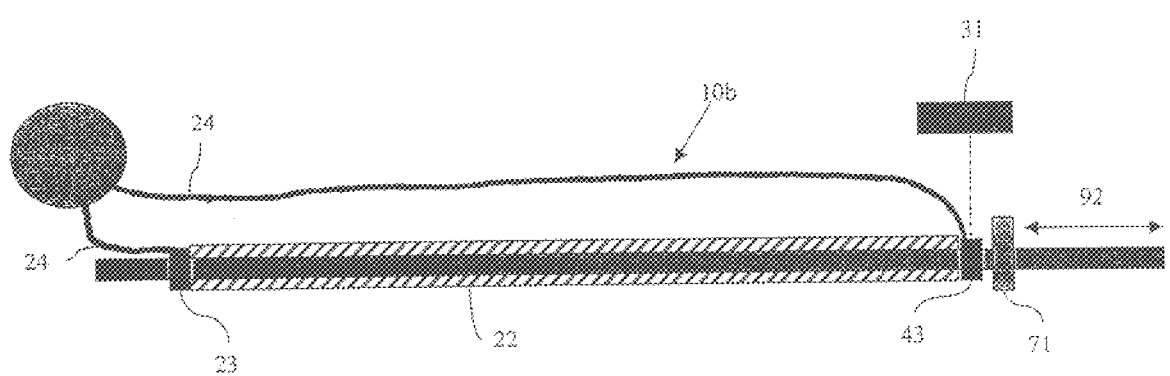
FIG. 12 illustrates a single heated insulated pipe, end fed, with cable return, with a buffer zone and a choke in the buffer zone and optional seawater return of leakage current.
Figure 13:
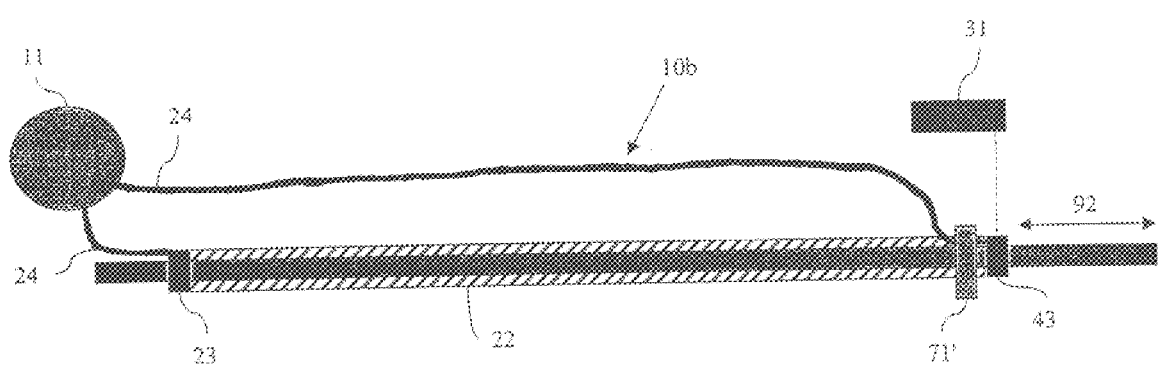
FIG. 13 illustrates a single heated insulated pipe, end fed, with cable return, with a buffer zone and a choke around the heated pipe and cable return, with optional seawater return of leakage current.
Figure 14:
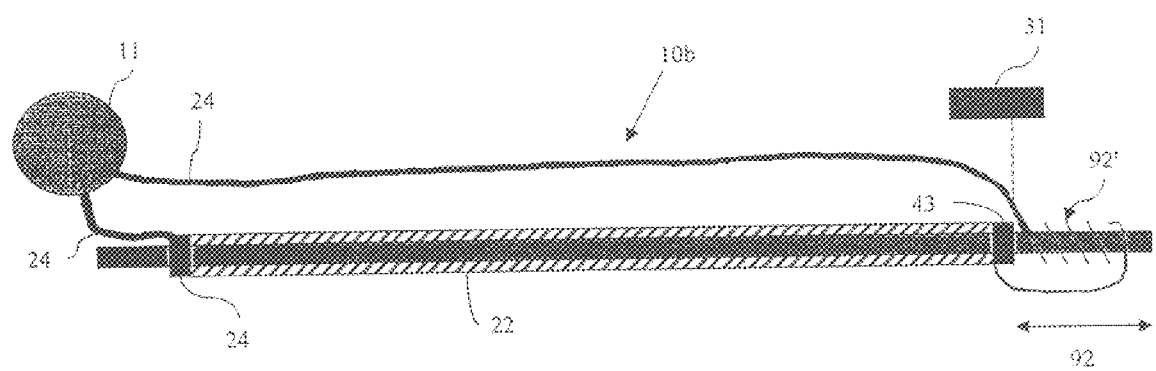
FIG. 14 illustrates a single heated insulated pipe, end fed, with cable return, with a buffer zone and a heater on the buffer zone, with optional seawater return of leakage current.
Figure 15:
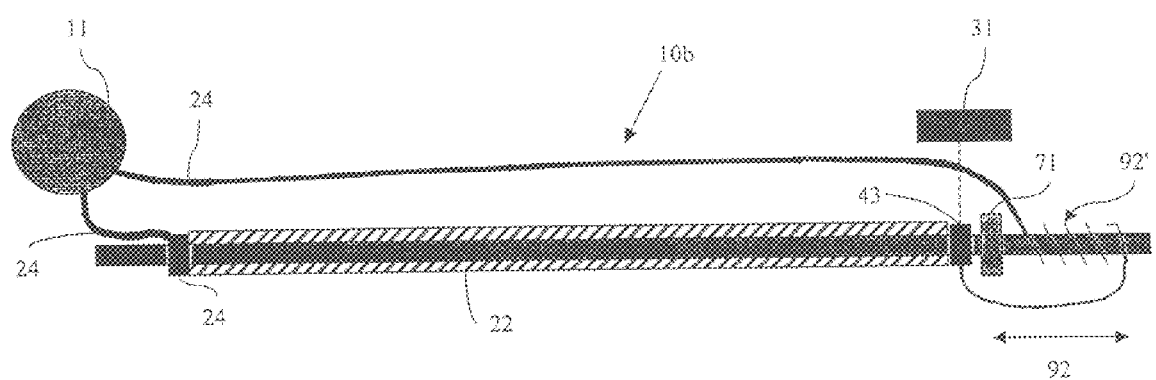
FIG. 15 illustrates a single heated insulated pipe, end fed, with cable return, with a buffer zone and a heater on the buffer zone and a choke in the buffer zone between the connector and heater, with optional seawater return of leakage current.
Figure 16:
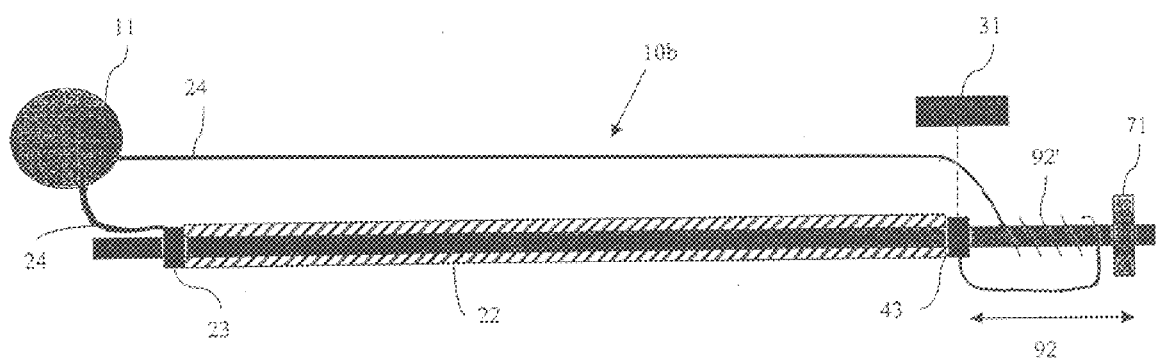
FIG. 16 illustrates a single heated insulated pipe, end fed, with cable return, with a buffer zone and a heater on the buffer zone and a choke in the buffer zone between the heater and nearby or attached structures, with optional seawater return of leakage current.
Figure 17:
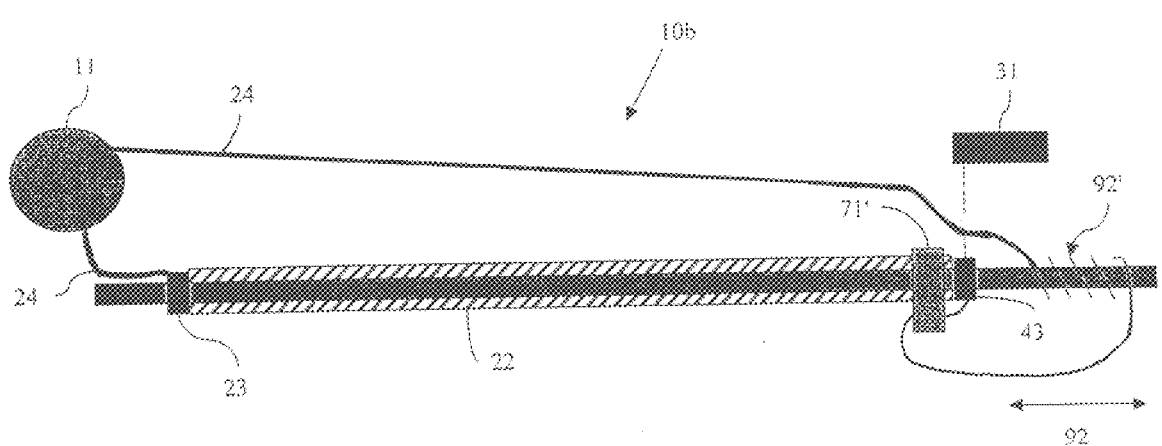
FIG. 17 illustrates a single heated insulated pipe, end fed, with cable return, with a buffer zone and a heater on the buffer zone and a choke on the heated pipe and a cable from the heater, with optional seawater return of leakage current.
Figure 18:
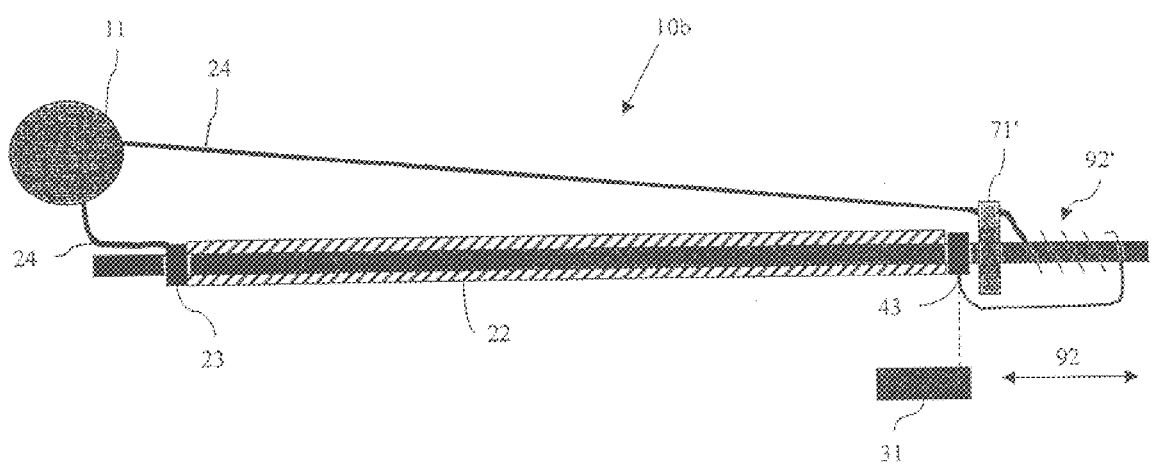
FIG. 18 illustrates a single heated insulated pipe, end fed, with cable return, with a buffer zone and a heater on the buffer zone and a choke on the buffer zone and a cable from the heater, with optional seawater return of leakage current.

FIG. 11 illustrates a configuration that is similar to that shown in FIG. 3 except that the current is returned by cable 24 instead of through the seawater. Some leakage current can flow through the capacitance formed by the pipe, its insulation and the seawater to pipe or structures adjacent to the remote end of the heated pipe. Seawater electrode 31 is shown connected to connector 43 by a dotted line, indicating that the seawater electrode is optional. The current though the seawater electrode will not be zero, however. Seawater electrode 31 may be used to provide a safer discharge path for this leakage current so that it does not flow through wellhead structures. Buffer zone 92 has the properties described above.

Figure 19:
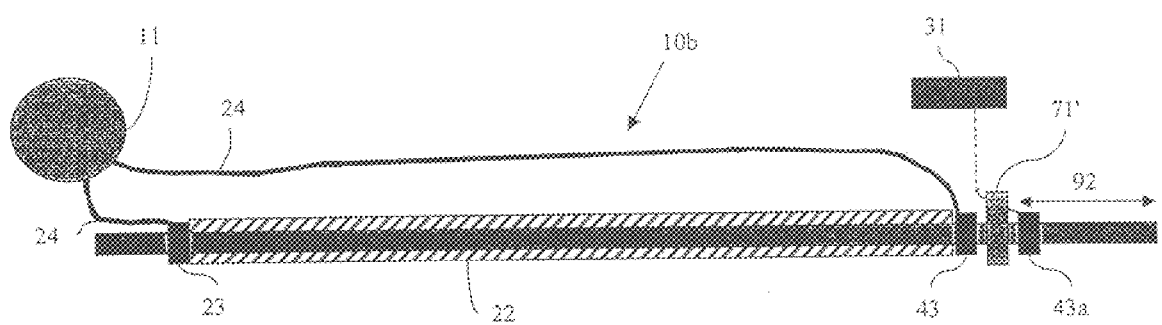
FIG. 19 illustrates a single heated insulated pipe, end fed, with cable return, with a buffer zone, with a second connector and a choke in the buffer zone, the choke around a cable from the second connector to a seawater electrode.

FIGS. 12 through 18 illustrate configurations that are analogous to the configurations shown above for seawater return, except cable 24 is used for return current. An optional seawater electrode may also be used for leakage current, as indicated by the dotted line to seawater electrode 31. FIG. 19 illustrates a configuration having two electrical connectors, 43 and 43A, with choke 71' between the connectors. Choke 71' encloses a segment of the pipeline between the electrical connectors and a cable from the second connector to seawater electrode 31.

Figure 20:
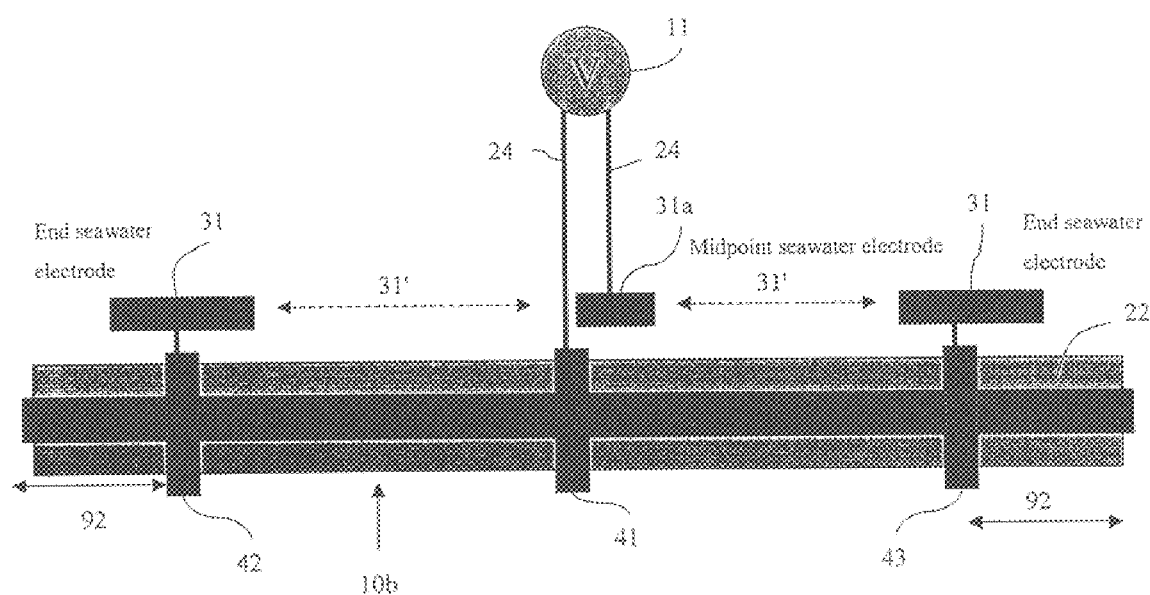
FIG. 20 illustrates a single heated insulated pipe, center fed, with seawater return, with buffer zones at each end.

In many oilfields, pipelines must be heated in segments and cannot be heated in one long segment starting at the host. For such pipelines, it is not possible to apply electric power to the entire pipeline through a host insulating joint. FIG. 20 shows a basic version of a configuration that can be applied to such cases. Power is applied to connector 41 at the center of the heated segment, and returned from both ends of the segment through a seawater return current 31'. As in the end-fed configurations described previously, buffer zone 92 is provided adjacent to each seawater electrode 31 to prevent large leakage currents flowing down the pipeline from heated segments to areas where they may cause damage from AC corrosion or interfere with control systems. With the center-fed configuration shown in FIG. 20 no insulating joint is required. Buffer zones 92 may be about 50 meters in length, for example.

Figure 21:
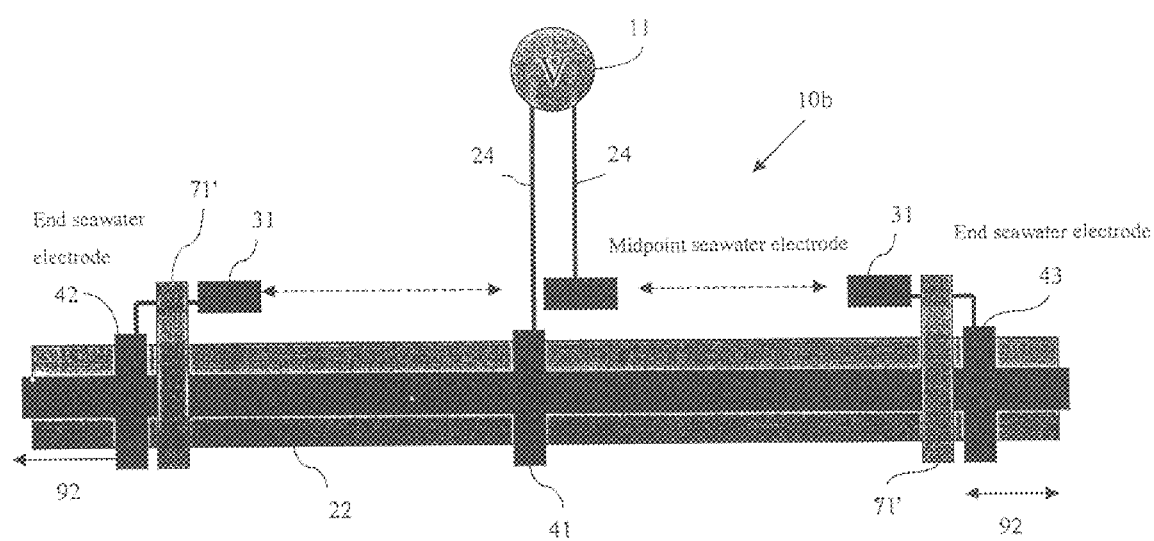
FIG. 21 illustrates a single heated insulated pipe, center fed, with seawater return, with buffer zones at each end and current-balancing chokes around the return cable on the heated pipe.

FIG. 21 shows a configuration similar to that of FIG. 20 except that current balancing-chokes 71' are added near each end of segment 10b. The chokes enclose the pipeline and a cable returning heating current through seawater electrodes 31 for each end of segment 10b. As explained above, these chokes tend to minimize current flow into buffer zones 92 and force more of the heating current into the seawater electrodes.

Figure 22:
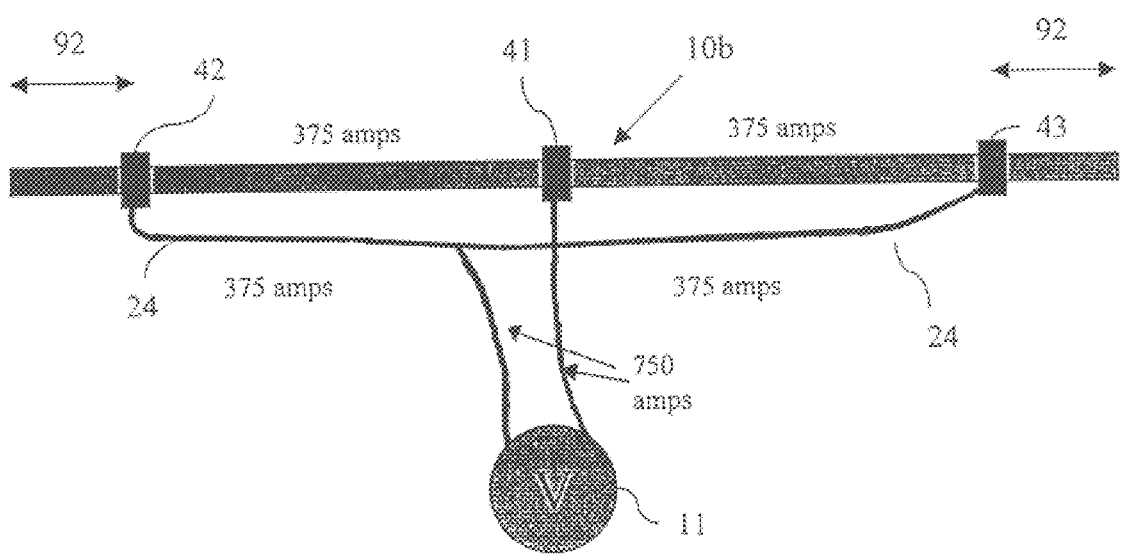
FIG. 22 illustrates a single heated insulated pipe, center fed, with cable return and buffer zones at each end.
Figure 23:
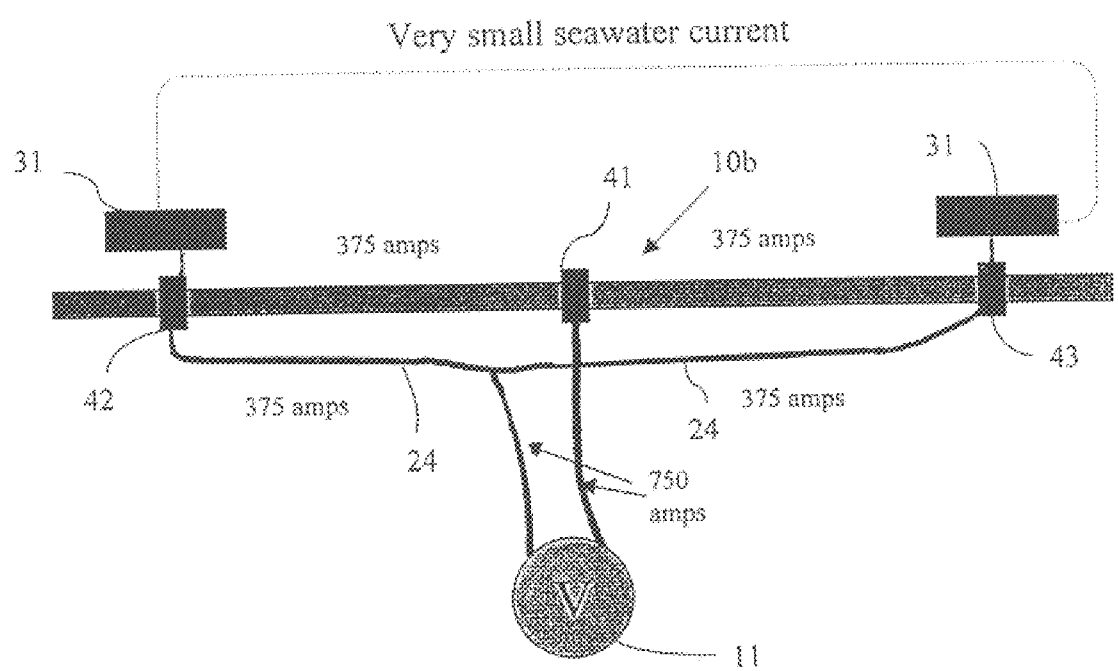
FIG. 23 illustrates a single heated insulated pipe, center fed, with cable return and buffer zones at each end with optional seawater return of leakage current.
Figure 24:
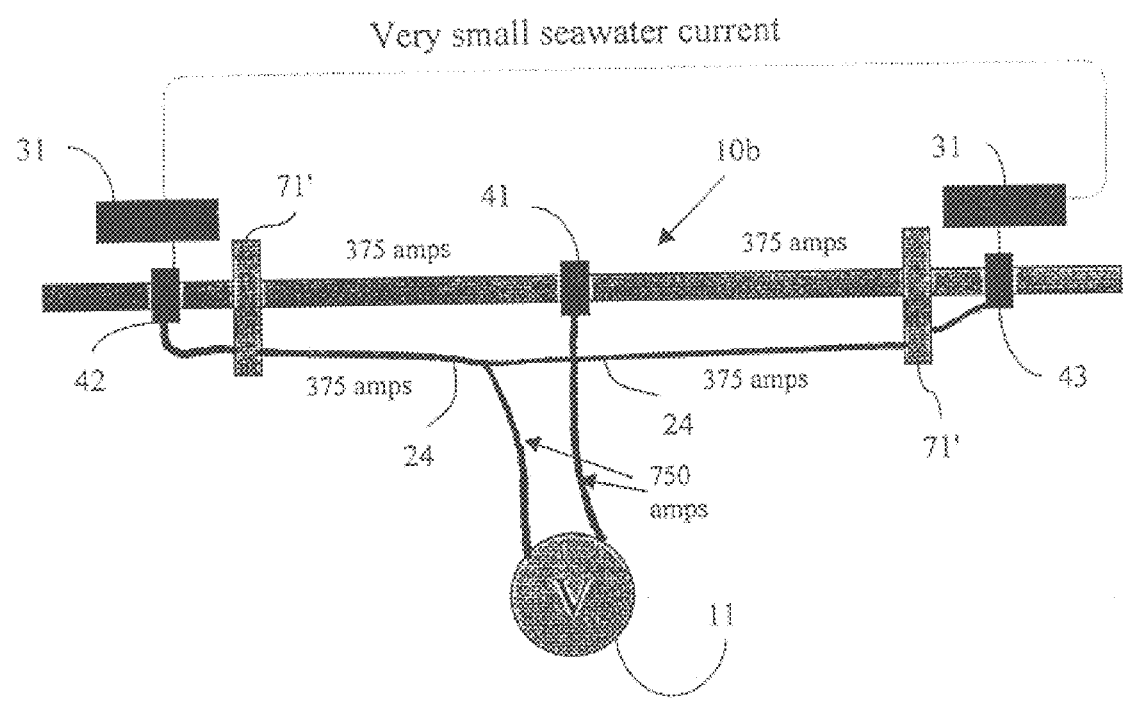
FIG. 24 illustrates a single heated insulated pipe, center fed, with cable return and buffer zones at each end with a choke on the heated pipe and around the return cable with optional seawater electrode for leakage current.
Figure 25:
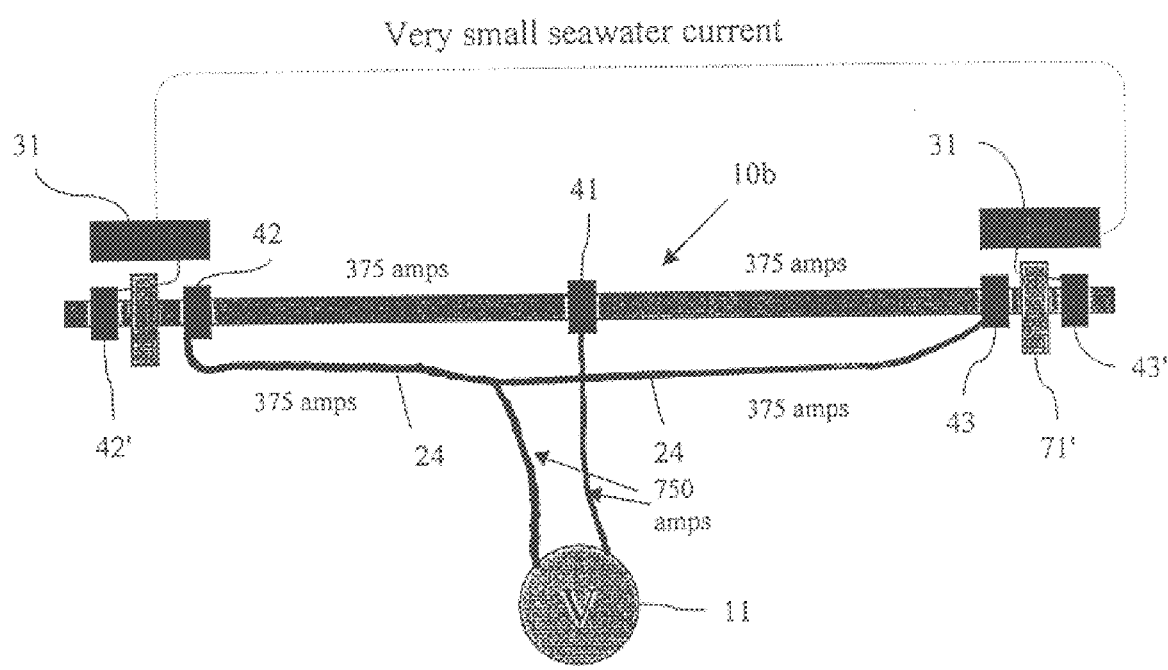
FIG. 25 illustrates a single heated insulated pipe, center fed, with cable return and buffer zones at each end with additional connectors and chokes around the return cables in the buffer zones with seawater electrodes for leakage current.

FIG. 22 shows a configuration similar to FIG. 20 but with the current return through a cable instead of through the seawater. In FIG. 23, seawater electrodes are added at the ends of the heated segment 10b shown in FIG. 22 to allow a safe path for leakage current that may result from a small voltage difference between the two ends of the heated pipe segment. If these electrodes were not provided, the leakage current would flow from the pipe to adjacent structures, possibly resulting in AC corrosion of those structures. FIG. 24 shows the same configuration as FIG. 23 with current-balancing chokes 71' added to force the heating current back through the return cable. FIG. 25 shows the same configuration as FIG. 23 with current-balancing chokes 71' added to force all the leakage current into the seawater through the seawater electrodes. Example values of current flow are shown in these figures. A current of 750 amperes from power supply 11 is split at center connector 41 with equal current flowing toward electrical connectors 42 and 43 at opposite ends of segment 10b.

Figure 26:
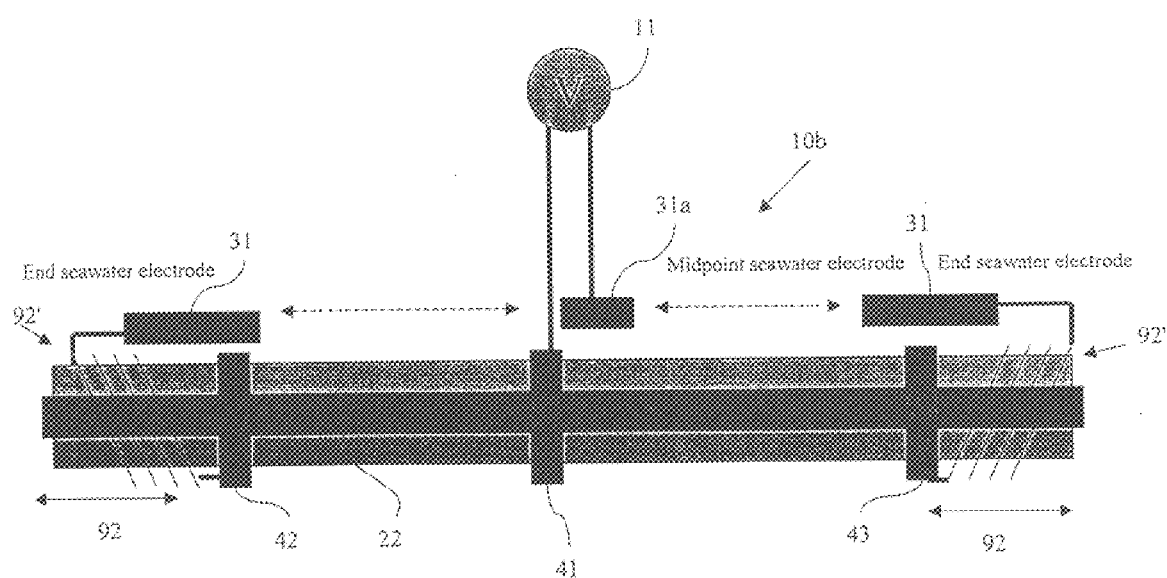
FIG. 26 illustrates a single heated insulated pipe, center fed, with seawater return and buffer zones at each end with heaters in the buffer zones.
Figure 27:
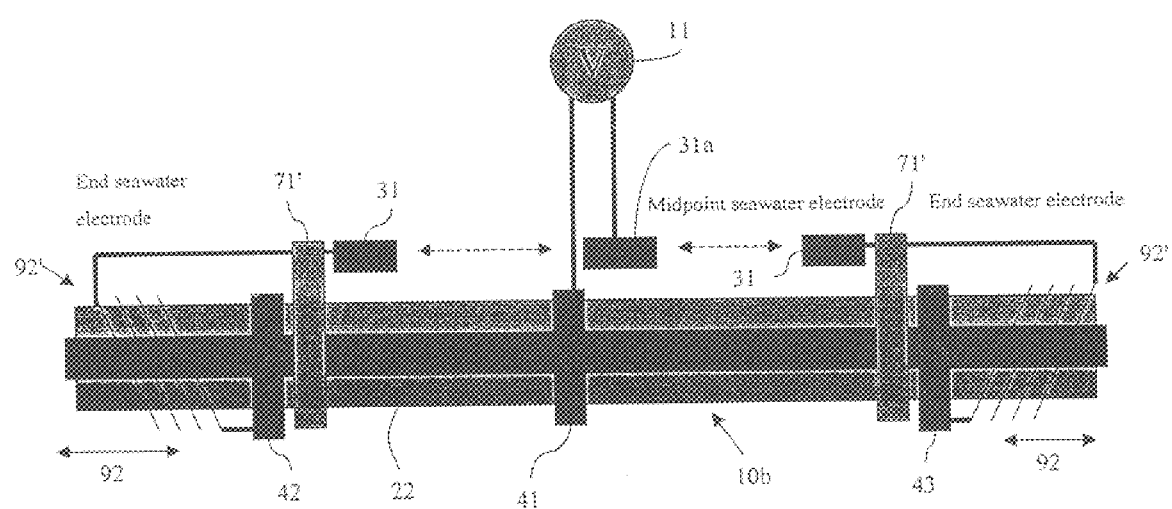
FIG. 27 illustrates a single heated insulated pipe, center fed, with seawater return and buffer zones at each end, with heaters in the buffer zones and chokes on the heated pipe around return current cables.
Figure 28:
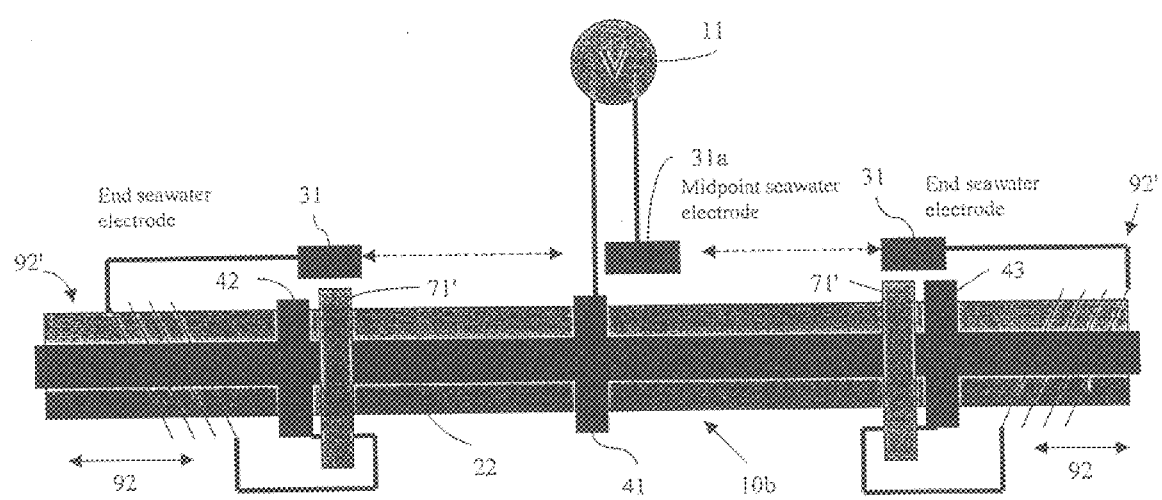
FIG. 28 illustrates a single heated insulated pipe, center fed, with seawater return and buffer zones at each end, with heaters in the buffer zones, chokes on the heated pipeline and around the heating current.

FIG. 26 shows the same configuration as FIG. 20 with series heating elements 92' added to provide heating for buffer zones 92. FIG. 27 shows the same configuration as FIG. 26 with current balancing chokes 71' added to force the heating current back through the seawater. FIG. 28 shows the same configuration as FIG. 27 with an alternative placement of the current-balancing chokes 71'.

Figure 29:
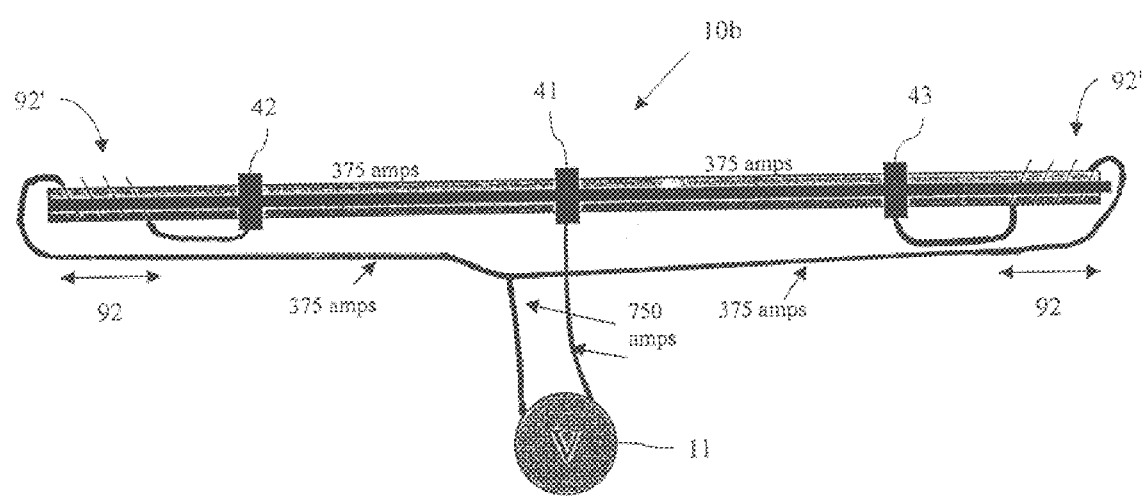
FIG. 29 illustrates a single heated insulated pipe, center fed, with cable return and buffer zones at each end, with heaters in the buffer zones, showing illustrative values of electrical current.
Figure 30:
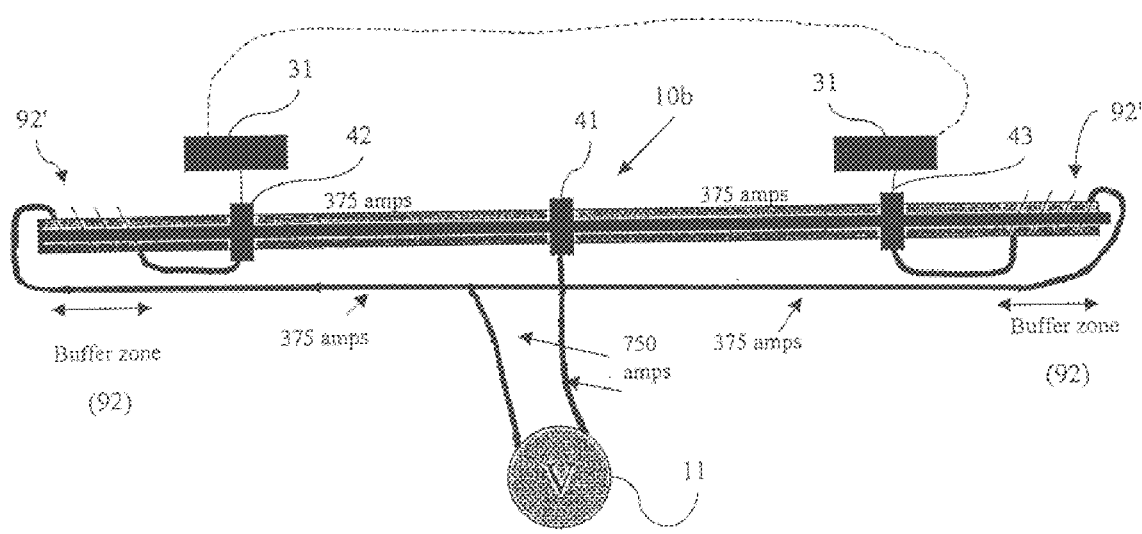
FIG. 30 illustrates a single heated insulated pipe, center fed, with cable return and buffer zones at each end, with heaters in the buffer zones and seawater electrodes for leakage current.

FIG. 29 shows the same configuration as FIG. 22 with series heating elements 92' added to provide heating for buffer zones 92. FIG. 30 shows the same configuration as FIG. 29 with seawater electrodes 31 to provide a safe path to seawater for leakage current, in the same manner as shown in FIG. 23.

Figure 31:
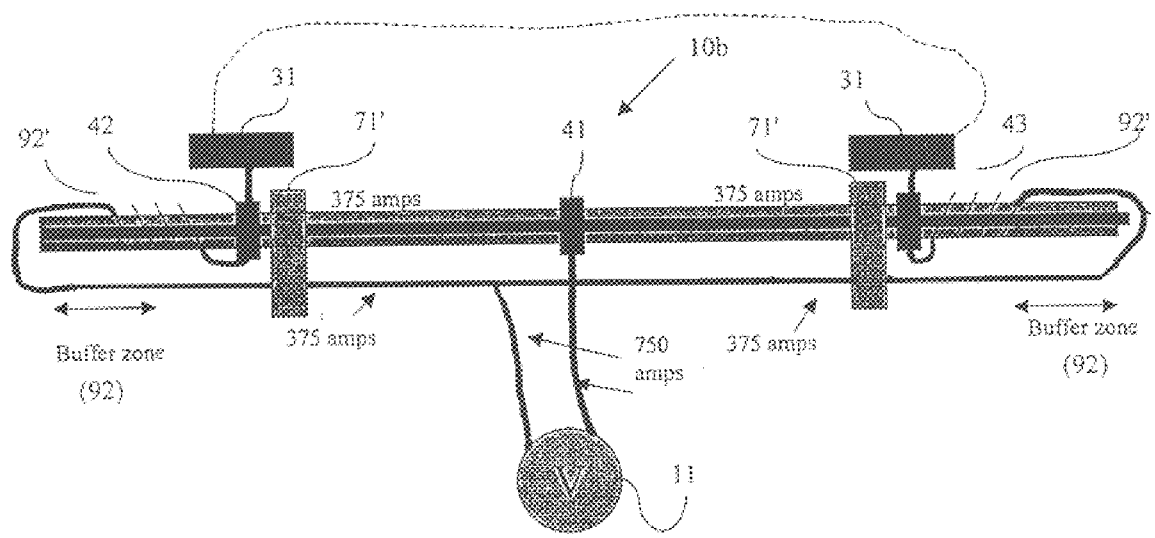
FIG. 31 illustrates a single heated insulated pipe, center fed, with cable return and buffer zones at each end, with separate heaters in the buffer zones and current-balancing chokes on the heating current. and seawater electrodes for leakage current.
Figure 33:
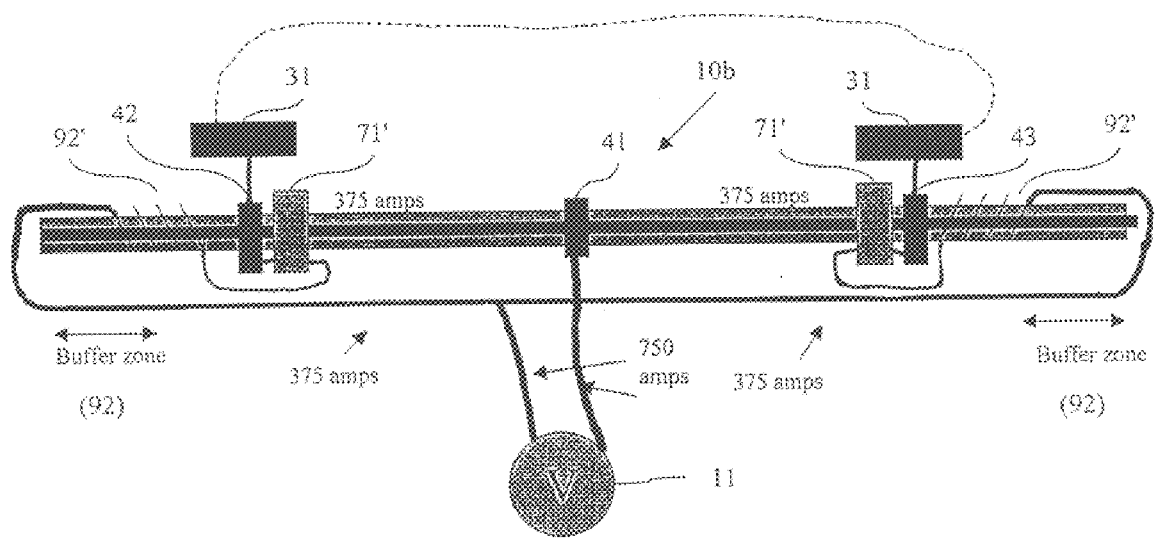
FIG. 33 illustrates a single heated insulated pipe, center fed, with cable return and buffer zones at each end, with separate heaters in the buffer zones and current-balancing chokes on the heating current and seawater electrodes for leakage current.

FIGS. 31 and 33 show the same configuration as FIG. 30 with current-balancing chokes 71' added to force the heating current to return through cables 24. In FIG. 31 the chokes surround the return cable between heater 92' in buffer zones 92 and power supply 11. In this case the seawater current is small (0 amps if everything is uniform and symmetric and calculated to be about 20 amps for a 10 per cent difference in pipe impedance between sides for an 11-mile pipeline. This is true of any symmetric return cable-fed configuration with leakage current electrodes.) In FIG. 33, the chokes surround the cable from connector 43 to electrical heater 92'. Again, the seawater current is small and of the same magnitude as for FIG. 31.

Figure 32:
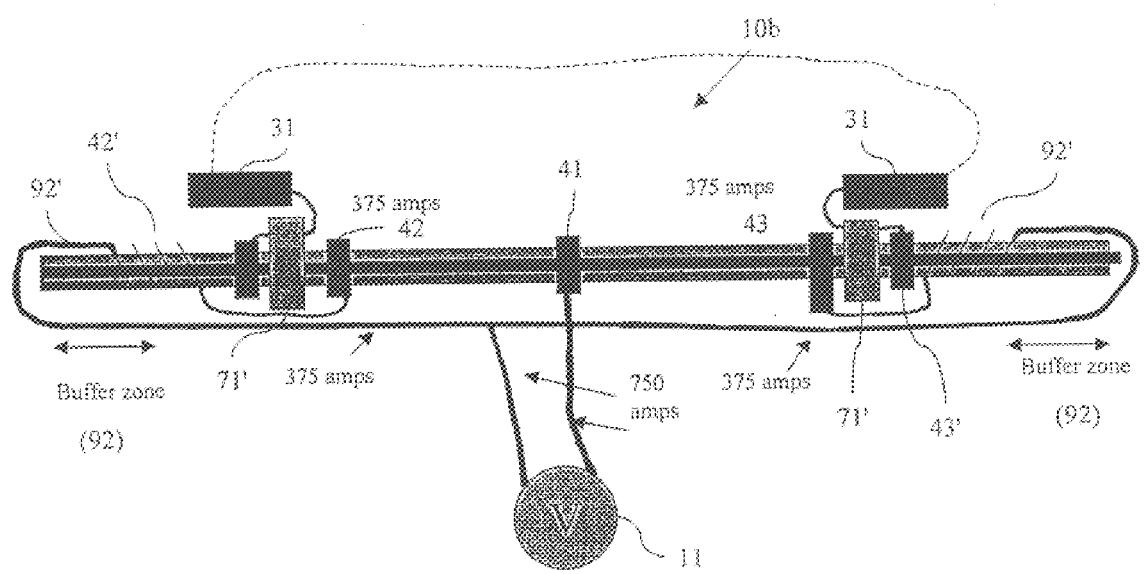
FIG. 32 illustrates a single heated insulated pipe, center fed, with cable return and buffer zones at each end, with separate heaters in the buffer zones and current-balancing chokes on the leakage current and seawater electrodes for leakage current.

FIG. 32 shows the same configuration as FIG. 30 with current-balancing chokes 71' added to force the leakage current into the seawater. Also, connectors 43' have been added. FIGS. 29 to 33 also show examples of the magnitude of heating currents that may be used.

For "center-fed" systems shown in FIG. 20 through 33, if the average pipe impedance differs in each half, the current flow and heating in the two halves may be somewhat different. To avoid this, it may be helpful to sort the pipe to ensure that pipe impedance in the two halves is nearly equal. Additionally, if the impedance of joints of pipe varies significantly from one joint to the next, some pipe joints will be heated more than others. This condition is acceptable if heating is only desired during flowing conditions, since flow will distribute the heat along the pipe. If heating is desired during shut-in conditions, the pipe must either be nearly uniform in impedance, or enough current must be provided to heat the lowest impedance pipe to the desired temperature. Sorting of joints of pipe by impedance is known. Alternatively, the feed-point may be intentionally imbalanced and pipe of different impedance used on either side to maintain uniform heating, or different amounts of heating may be applied to each side, if desired for the application, by imbalancing the feed point. It should be understood that the terms "midpoint" or "center-fed" as used herein is not restricted to a location at the geometrical midpoint of a segment of pipeline, but is defined broadly enough to encompass the selected variations in location described in this paragraph or any location between the ends of a segment to be heated. The "center-fed" concept may be used to heat an entire flowline, or one or more segments as appropriate for the application.

For some flowlines, wells may be connected at one or more points along their lengths, and not just at the end of the flowline. In this case, short lengths of pipe, called "jumpers," are used to connect the pipeline to the wellheads. The same heating methods may be used for jumpers as described for buffer zones. Power may be supplied by connecting heating elements in series with the pipeline heating cable, from a transformer connected in series with the pipeline heating cable, from a toroidal transformer using the pipe itself as a primary winding or any other source of power. Methods for inductive heating of pipe are disclosed in commonly assigned patent application titled "Induction Heating for Short Segments of Pipeline Systems," filed concurrently herewith as Ser. No. 09/628,391, now U.S. Pat. No. 6,278,095 issued Aug. 21, 2001, which is hereby incorporated by reference herein.

Figure 34:
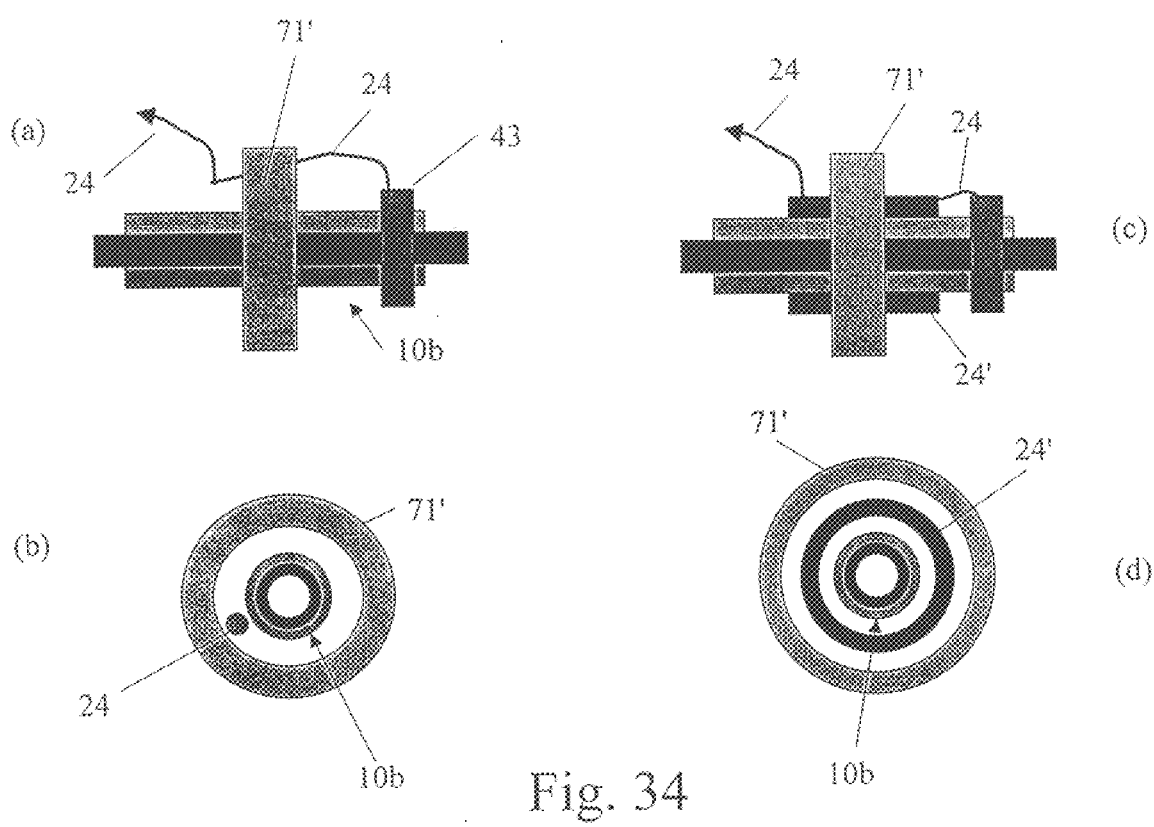
FIGS. 34(a), 34(b), 34(c) and 34(d) illustrate a design of a choke using concentric conductors in place of a cable in current-balanced chokes.

For current-balancing chokes, the chokes are better balanced with a more uniform magnetic field inside the choke. Compared to passing the pipe and cable through the choke, improved uniformity can be achieved by providing a conductor that is concentric around the pipe instead of passing cable through a choke. Such an arrangement is shown in FIG. 34. In FIG. 34(a) a transverse cross-section view of choke 71' around heated segment 10b and cable 24, such as illustrated in the foregoing figures, is shown. Electrical current would pass from connector 43 by cable 24 and through choke 71'. In FIG. 34(b) an end view is shown. This geometry produces highly non-homogeneous magnetic fields around the pipe and the cable. In FIG. 34(c), a transverse cross-section view of an arrangement that will produce more homogeneous fields around conductors is shown. An end cross-section view is shown in FIG. 34(d). In this case, heated segment 10b and conductor 24', which conducts the electrical current through choke 71', are concentric. The more uniform magnetic fields around the pipe and conductor will provide more effective choking action. It should be understood that the choking arrangement of FIGS. 34(c) and 34(d) can be utilized in any of the configurations including chokes disclosed herein.

Figure 35:
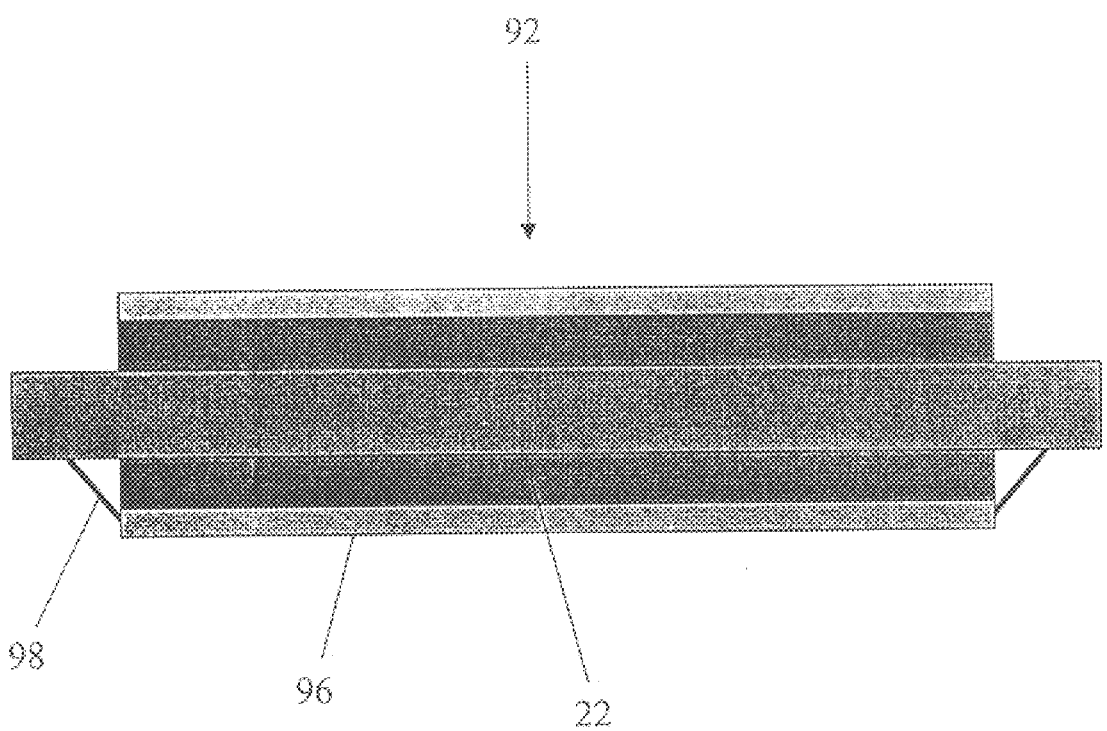
FIG. 35 illustrates a buffer zone with the pipe partially or completely covered with thermal insulation and an electrical conductor that serves as a seawater electrode.

Buffer zone 92 is shown in FIGS. 3–33. A buffer zone may be electrically and/or thermally insulated. If buffer zone 92 is heated, as provided in some embodiments described herein, thermal insulation of the buffer zone will of course be preferable. The thermal insulation may be electrically conductive; but if it is not, an electrically conductive pipe may be placed around the thermal insulation and electrically connected to the pipe. FIG. 35 illustrates buffer zone 92 that is partially covered with insulation layer 22. Electrical conductor pipe 96 has been placed over the insulation and electrically connected to the pipe by strap 98. Pipe 96 may be formed from stainless steel of other material that has low magnetic permeability, such that heating under pipe 96 may also be provided by an inductive coil, as described in various embodiments above. Normally it is desirable to apply thermal insulation to the buffer zone, since hydrate plugs may form in it as well as in the main flowline. The exterior surface of the buffer zone may be electrically conductive but is not required to be. For example, the buffer zone may be bare pipe, or thermally insulated pipe with an external electrically conductive layer (for example, bare pipe or conductive coating on the insulation). If it is conductive, it may serve as a seawater electrode with the configuration in FIG. 35 or it can be thermally and electrically insulated with a completely separate seawater electrode.

While the foregoing, for ease of illustration, has been described with reference to subsea pipelines for transporting crude oil, the invention is equally applicable to natural gas applications where gas liquids and water are present. The invention may also be applied in marine drilling risers, in which case a segment of a drilling riser would replace the pipeline segment.

It may be desirable or necessary to heat separate parts of a flowline with separate heating circuits and different methods may be required or desired. For example, the riser may be heated separately from the flowline, or the riser only may be heated and not the flowline. A buffer zone would separate a segment of pipe heated by the apparatus and method disclosed herein from other segments using either the methods and apparatus disclosed here or any other apparatus or method.

U.S. Provisional Application No. 60/147,018, filed Aug. 3, 1999, is hereby incorporated by reference herein.

While particular preferred embodiments of the present invention have been described, it is not intended that these details should be regarded as limitations on the present invention, except to the extent that they are included in the following claims.

What is claimed is:

1. Apparatus for electrically heating a selected segment of a subsea pipeline, said selected segment having a host end and a remote end, comprising:

a layer of electrical insulation surrounding said selected segment for preventing electrical current flow between said segment and surrounding seawater;

an insulating joint connected to said host end of said selected segment, said insulating joint having a first electrical connector for applying an electrical voltage to said host end of said selected segment;

an electrical power supply having at least two terminals;

a first electrical cable connected between a first terminal of said power supply and said first electrical connector of said insulating joint;

a second electrical connector connected to said remote end of said selected segment; and a second electrical cable connected between said second electrical connector and a second terminal of said electrical power supply.

2. The apparatus of claim 1 further comprising a buffer zone outside said remote end of said first segment, said buffer zone being a second segment of said pipeline between said first segment and an adjacent structure.

3. The apparatus of claim 2 further comprising a seawater electrode for connecting said first electrical cable to said first electrical connector.

4. The apparatus of claim 2 further comprising an electrical choke around said pipeline and in said buffer zone.

5. The apparatus of claim 2 further comprising an electrical choke around said pipeline, said choke being disposed between said first electrical connector and said insulating joint, said cable for connecting said electrical connector to said power supply passing through said electrical choke.

6. The apparatus of claim 2 further comprising an electrical heater in series between said first electrical cable for connecting said first electrical connector and said power supply and said first electrical connector and being disposed for heating said buffer zone.

7. The apparatus of claim 6 further comprising an electrical choke between said first electrical connector and said electrical heater.

8. The apparatus of claim 6 further comprising an electrical choke between said electrical heater and said adjacent structure.

9. The apparatus of claim 6 further comprising an electrical choke between said first electrical connector and said insulating joint and around a cable for connecting said electrical heater and said first electrical connector.

10. The apparatus of claim 6 further comprising an electrical choke between said electrical connector and said electrical heater, said choke being around said cable for connecting said first electrical connector and said power supply.

11. The apparatus of claim 2 further comprising a distal electrical connector in said buffer zone, a choke disposed between said electrical connector and said distal electrical connector, said choke being around a cable from said distal electrical connector and a seawater electrode.

12. A method for heating a selected segment of a subsea pipeline having a host end and a remote end, comprising:

applying an electrically insulating layer around the segment;

connecting an insulating joint at the host end;

connecting an electrical connector at the remote end and connecting an electrical cable between the electrical connector and a power supply;

connecting the power supply to the insulating joint; and providing a selected amount of electrical power from the power supply.

13. The method of claim 12 further comprising the step of providing a buffer zone having a selected length of the pipeline between the electrical connector and an adjacent structure or equipment.

14. The method of claim 13 further comprising the step of placing an electrical choke around the pipeline in the buffer zone.

15. The method of claim 12 further comprising the step of placing an electrical choke around the pipeline and around a cable carrying current so as to minimize current flow in the pipeline outside the selected segment.

16. The method of claim 12 further comprising the step of placing an electrical heater so as to heat the buffer zone, the heater being in series with a current flowing through the selected segment of the pipeline.

17. The method of claim 16 further comprising the step of placing an electrical choke around the pipeline and passing a selected electrical cable through the choke so as to decrease current flow outside the insulated segment.

* * * * *